United States Patent Office 3,836,593
Patented Sept. 17, 1974

3,836,593
POLYALKENAMERS AND PROCESS FOR THE PREPARATION THEREOF
Roland Streck and Heinrich Weber, Marl, Germany, assignors to Chemische Werke Huls Aktiengesellschaft, Marl, Germany
No Drawing. Filed Feb. 3, 1972, Ser. No. 223,294
Claims priority, application Germany, Feb. 4, 1971, P 21 05 161.6
Int. Cl. C08f 1/80
U.S. Cl. 260—677 R    8 Claims

ABSTRACT OF THE DISCLOSURE

The molecular weight of polyalkenamers produced by a ring-opening polymerization of cyclic olefins employing a catalyst containing a metal of Subgroups 5 to 7 of the Periodic Table is regulated by conducting the polymerization in the presence of a non-conjugated olefin containing at least two non-conjugated double bonds, at least one of which is acyclic, and 0–2 alkyl or aryl groups.

BACKGROUND OF THE INVENTION

This invention relates to a process for the preparation of polyalkenamers by the ring-opening polymerization of cyclic olefins employing a catalyst containing a metal of Subgroups 5 through 7 of the Periodic Table or a compound thereof and to novel polyalkenamers thus-produced.

It is known that cyclic olefins containing at least one unsubstituted ring double bond can be polymerized under ring-opening conditions. The catalysts employed for this ring-opening polymerization are supported catalysts which contain a metal of Subgroups 5 through 7 of the Periodic Table, or the compounds thereof. See German Published Application DAS 1,072,811. Preferred catalysts are the reaction products of compounds of the above-mentioned metals with organometallic compounds or hydrides of metals of Main Groups 1 through 3 or Subgroup 2 of the Periodic Table, as well as optionally compounds which contain one or more hydroxy and/or sulfhydryl groups. See French Pats. 1,394,380 and 1,467,720; the published disclosures of Dutch Patent Applications 65–10,331; 66–05,105; 66–14,413; 67–04,424; 68–06,208; and 68–06,211. The catalysts described therein contain compounds of molybdenum or tungsten and, as organometallic compounds, usually organoaluminum compounds. According to the published texts of Dutch Patent Applications 67–14,559 and 68–06,209, vanadium, niobium, tantalum, rhenium, technetium, or manganese can also be components of such catalyst systems.

In accordance with German Unexamined Published Application DOS 1,909,226, it is also possible to employ catalyst systems containing a halide or an oxyhalide of molybdenum or tungsten wherein the stage of oxidation of the metal is 4, 5 or 6, an aluminum trihalide.

With the aid of these catalysts, a great variety of polymers can be prepared with structures which are strictly regular along the polymer chains, the structure of the polymer units being exclusively dependent on the cycloolefin employed as the monomer. Thus, it is possible, for example, to produce linear polymers by the polymerization of monocyclic olefins; polymers having recurring polymer units containing a single ring by the polymerization of bicyclic olefins; and, in general, polymers having recurring polymer units which contain one ring less than the starting monomer by the polymerization of polycyclic olefins.

The polyalkenamers produced by the polymerization of monocyclic olefins are of particular interest for the additional reason that, depending on the cycloolefin employed, it is possible to prepare polymers having differing double bond content. Thus, polybutenamers which are free of vinyl groups, i.e., pure 1,4-polybutadienes, are obtained from cyclobutene, 1,5-cyclooctadiene, and 1,5,9-cyclododecatriene. Polypentenamers are obtained from cyclopentene which have three —$CH_2$-groups disposed between the double bonds. Polyoctenamers are produced from cyclooctene which correspond to a completely regular semi-hydrogenated 1,4-polybutadiene. Polydecenamers are prepared from cyclododecene corresponding to a two-thirds hydrogenated 1,4-polybutadiene in which remaining double bonds are arranged in the molecule at regular intervals. Accordingly, it is possible to produce polymers, the structures of which represent variations from pure 1,4-polybutadienes, free of vinyl groups, to strictly linear polyethylenes or polymethylenes.

It is likewise known that the average molecular weight or the degree of polymerization of a polymer affects properties of the polymer and thus its usefulness in any particular field of application, as well as its characteristics during the production and processing. Thus, polymer solutions of equal weight concentration of polymer are more viscous, the higher the molecular weight of the polymer in solution. Thus, difficulties are encountered with solutions of very high-molecular polymers, e.g., during the polymerization, for example, in the mixing or obtaining satisfactory heat exchange, and increased energy requirements for the agitating step result. Also, the further processing of very high-molecular polymers is difficult. For this reason, they are often degraded mechanically, chemically, or thermally prior to the final shaping procedure, e.g., injection-molding, extrusion, or calendering.

The polyalkenamers obtained during the ring-opening polymerization of cycloolefins are normally very high-molecular weight. Because of the above-described difficulties with polymers of very high molecular weight, attempts have been made in the prior art to develop processes for regulating the molecular weight of the polymers producible by a great variety of polymerization methods. In the polymerization of α-olefins with organometallic mixed catalysts, the so-called hydrogen regulation, i.e., polymerization in the presence of a certain partial hydrogen pressure, proved useful. Other possibilities for controlling the molecular weight of α-olefin polymers were varying the catalyst components, elevating the temperature or adding alkylzinc or alkylcadmium compounds during the polymerization.

Although organometallic mixed catalysts or related catalyst systems are also employed in the ring-opening polymerization of cycloolefins, the methods for molecular weight regulation employed in the polymerization of the α-olefins either are unsuccessful or exhibit definite disadvantages which make the use of such methods difficult, if not impossible. Thus, hydrogen, for example, up to an excess pressure of 4 atmospheres exerts practically no influence at all on the molecular weight of the polyalkenamers prepared by the ring-opening polymerization of cycloolefins. Even if hydrogen were effective at pressures higher than those mentioned above, the hydrogen regulating method would require increased investment costs, since the plant would have to be designed for pressures which do not occur in the unregulated ring-opening polymerization of the cycloolefins which, under normal pressure, are present in the liquid phase or in solution at the polymerization temperature. Although the molecular weight of the polyalkenamers can be reduced by employing a higher polymerization temperature, the yield and the steric uniformity of the polymers are impaired in so doing. Moreover, due to the temperature sensitivity of the mixed catalysts customarily employed for the ring-opening polymerization of cycloolefins, such catalysts become inactive above 40–50° C. in a short period. Also, modifications of an optimal catalyst system can strongly impair yield. See, for example, Dutch Patent Application 66–05,105, p. 16.

The last of the above-mentioned methods for controlling the molecular weight during the polymerization of α-olefins with organaometallic mixed catalysts, i.e., using an alkylzinc or alkylcadmium compound as the controlling agent, is of little practical use, even if it were effective in the ring-opening polymerization of cycloolefins, because such zinc and cadmium compounds are very toxic and can be prepared only with difficulty and thus are expensive.

The only process heretofore known wherein polymers are obtained which exhibit improved processability is described in British Pat. 1,098,340. In this process, cyclic monoolefins are copolymerized under ring-opening in the presence of a conjugated diolefin, such as, for example, butadiene, isoprene, or 1,3-pentadiene. The thus-produced copolymers contain polymer units derived from both the cycloolefin and the conjugated diolefin, in varying molar ratios.

As shown in Comparative Experiments N through T in Table 3, conjugated dienes, although they influence the molecular weight of the polyalkenamers produced in polymerizations conducted in their presence, also are more or less strong catalyst poisons. Thus, for example, the presence of only 1 mol percent of 1,3-butadiene, 5 mol percent of isoprene, 5 mol percent of 2,3-dimethyl-1,3-butadiene, or 10 mol percent of 2,4-hexadiene, results in the complete inhibition of the polymerization catalyst and no polymer is obtained. Cyclic conjugated diolefins also cause a pronounced lowering of the yield of polymer. Moreover, it is not possible using such dienes as polymerization regulators to produce polymers which are waxy or oil-like products having very low molecular weights, e.g., about 500–5000.

In our prior filed Application Ser. No. 70,497 (Huels 207) filed Sept. 8, 1970, we claim a process for the regulation of molecular weight of polyalkenamers by the addition of monoolefins, preferably α-olefins, during the polymerization.

Accordingly, it is an object of the present invention to provide a process which makes possible, in a simple manner, to simultaneously regulate the molecular weight of polyalkenamers produced by the ring-opening polymerization of cyclic olefins and to introduce functional terminal groups into the polymer molecular. Another object is to provide novel polymers thus-produced. Other objects will be apparent to those skilled in the art to which this invention pertains.

SUMMARY OF THE INVENTION

According to this invention, the molecular weight of polyalkenamers produced by the ring-opening polymerization of cyclic olefins employing a catalyst containing a metal of Subgroups 5 to 7 of the Periodic Table is regulated by conducting the polymerization in the presence of a non-conjugated olefin containing at least two non-conjugated double bonds, at least one of which is acyclic and substituted by 0–2 of straight-chain or branched alkyl or cycloalkyl of 1–20 carbon atoms and aryl of 6–14 carbon atoms, the latter optionally being substituted by 1–5 straight-chain, branched, or cycloaliphatic saturated alkyl of 1–10 carbon atoms each. The remainder of the olefinic molecule may contain as many double bonds as desired of any type, so long as none are conjugated with another.

DETAILED DISCUSSION

The ring unsaturated cycloolefin employed in the process of this invention are unsaturated hydrocarbons containing one or more rings, at least one of which contains at least one unsubstituted non-conjugated double bond.

The cycloolefins polymerized according to the process of this invention preferably contain 4 to 12 ring carbon atoms and a total of 4 to 20, preferably 4 to 15 carbon atoms; from 1 to 3, preferably 1 to 2 rings, which can be fused or separate cycloaliphatic rings; whose ring carbon atoms are unsubstituted or one or more of which are substituted with lower alkyl, e.g., of 1 to 4 carbon atoms, cycloalkyl, e.g., of 5 to 7 carbon atoms, or aryl, alkaryl, or aralkyl, e.g., of 6 to 10 carbon atoms.

Preferred classes of starting cycloolefins are the following:

(a) those containing 1 to 2 non-conjugated double bonds, preferably one;
(b) those containing 1 to 2 rings, preferably one;
(c) those of (a) and (b) containing two fused rings;
(d) those of (a), (b) and (c) containing 0–2 lower alkyl groups as the sole substituents on the ring carbon atoms, preferably 0;
(e) those of (d) containing 1–2 methyl groups as the sole substituents on the ring carbon atoms;
(f) those of (a), (b), (c), (d) and (e) wherein the unsaturated carbon atoms each bear a hydrogen atom; and
(g) those of (a), (b), (c), (d), (e) and (f) wherein the ring of the cycloolefin containing the unsaturation contains 5 or 7 to 12 ring carbon atoms.

Examples of cycloolefins which can be polymerized according to the process of this invention are cyclobutene, cyclopentene, cycloheptene, cyclooctene, cyclononene, cyclodecene, cycloundecene, cyclododecene, cis,cis-1,5-cyclooctadiene, 1-methyl-1,5-cyclooctadiene, 3,7-dimethyl-1,5-cyclooctadiene, 1,5,9-cyclododecatriene, 4,5-dimethyl-1,4,7-cyclodecatriene, cis,trans-1,5-cyclodecadiene, norbornene, dicyclopentadiene, dihydrodicyclopentadiene, and 4-phenylcyclooctene, and mixtures thereof. Cycloolefins which cannot be polymerized with ring-opening, e.g., cyclohexene and the derivatives thereof, are not employed as starting monomers in the polymerization process of this invention.

The polyunsaturated olefins of this invention can contain any desired number of double bonds, e.g., 2–5, preferably 2 or 3, so long as none are conjugated with each other. At least one such double bond must be acyclic, i.e., the double bonded carbon atoms are not ring members of a ring. Preferably, at least one of the double bonds is alpha, i.e., one of the double bonded carbon atoms is a terminal carbon atom. Thus, at least one of the double bonds preferably is at the 1-position of an alkyl group or is the double bond of a vinyl group.

The polyunsaturated olefin can be straight-chain or branched aliphatic or cycloaliphatic, e.g., containing 5–500 carbon atoms, preferably 6–20 carbon atoms, and can be unsubstituted or substituted by 1–2 straight-chain or branched alkyl or cycloalkyl of 1–20 carbon atoms, preferably 1–8 carbon atoms, e.g., methyl, ethyl, cyclopentyl, cyclohexyl, or aryl or 6–14 carbon atoms, e.g., phenyl, biphenyl, naphthyl, the latter optionally substituted by 1–5 straight-chain or branched alkyl or cycloalkyl of up to 10 carbon atoms, e.g., methyl, ethyl, cyclopentyl, cyclohexyl. In addition to the minimum two non-conjugated double bonds, the olefin molecule can contain any desired additional number of double bonds, so long as none are conjugated with each other.

Preferred classes of polyunsaturated olefins employed in the process of this invention are the following:

(a) those containing 2–3 double bonds, especially those wherein at least one is an α-double bond;
(b) straight chain alkadienes and alkatrienes and the corresponding compounds substituted by a single methyl group;
(c) cycloalkadienes, cycloalkatrienes, wherein at least one of the double bonds thereof is a vinyl group; and
(d) those of (a), (b), and (c) containing 6–12 carbon atoms.

Specific examples are 1,4-pentadiene, 1,4-hexadiene, 1,5-hexadiene, 1,4-heptadiene, 1,5-heptadiene, 1,6-heptadiene, 2,5-heptadiene, 2,6-heptadiene, 2-methyl-1,4-hexadiene, 3-methyl-1,5-hexadiene, 1,4,7-octatriene, 1,7-octadiene, 4-phenyl-2,7-nonadiene, 1,4,9-decatriene 1,5,9-decatriene, 1,11-dodecadiene, 3-allylcyclobutene, 3-vinylcyclopentene, 4-vinyl-1-cyclohexane, 1,2-divinylcyclobutane, 1,2-divinylcyclohexane, 1,2,4-trivinylcyclohexane, p-buten-2-yl-stilbene, m-allylstyrene, p-divinylbenzene, 3-vinyl-1,5-cyclooctadiene, vinylnorbornene, polybutadiene oil and other low-molecular polyalkenamers and copolyalkenamers. Especially preferred are 4-vinyl-1-cyclohexene, 1,5-hexadiene, 1,2-divinylcyclohexane and 1,2,4-trivinylcyclohexane.

The non-conjugated polyunsaturated olefins can be employed as pure compounds or in the form of mixtures. Especially suitable are the polyunsaturated olefins produced as by-products during the synthesis of the cycloolefins, which heretofore could not successfully be exploited commercially. Specific examples are 1,4,9-decatriene and 1,2-divinylcyclohexane, formed during the synthesis of cis,trans-1,5-cyclodecadiene, and 1,2-divinylcyclobutane and 4-vinyl-1-cyclohexene, produced during the synthesis of cis,cis-1,5-cyclooctadiene.

The ring-opening polymerization of cyclic olefins can be conducted by conventional procedures employing known catalysts. Thus, suitable catalysts are supported catalysts containing the metal of Subgroups 5 through 7 of the Periodic Table, for example, in the form of the carbonyl, sulfide, or superficially reduced oxide on a support such as, for example, aluminum oxide, aluminum silicate, or silica gel. Also suitable are mixed catalysts, e.g., containing a compound of a metal of Groups 5 through 7 of the Periodic Table and an organometallic compound or hydride of a metal of Main Groups 1 through 3 or Subgroup 2 of the Periodic Table and optionally, also a compound containing one or more hydroxy and/or sulfhydryl groups. However, preferably, mixed catalysts are employed containing a molybdenum or a tungsten compound. Preferred organometallic compounds are organolithium, organomagnesium and organoaluminum compounds, especially methylaluminum dichloride, ethylaluminum dichloride, methylaluminum sesquichloride and ethylaluminum sesquichloride. Compounds containing one or more OH- and/or SH-groups optionally can be employed concomitantly as a catalyst component, e.g., water, hydrogen sulfide, hydroperoxide, alkyl hydroperoxides, mercaptans, hydrodisulfides, alcohols, polyalcohols, polymercaptans and hydroxymercaptans. Saturated and unsaturated alcohols and phenols, viz., n-propanol, n-butanol, sec.-butanol, isobutanol, allyl alcohol, crotyl alcohol, phenol, o-m, m-, and p-cresol, α- and β-naphthol, eugenol and benzyl alcohol, especially methanol, ethanol, isopropanol, or tert.-butanol, are preferred.

The polymerization process of this invention is preferably conducted in solution. For this purpose, inert solvents inert under the reaction conditions are employed, e.g., benzene, cyclohexane, methylcyclohexane, isopropylcyclohexane, "Decalin," hydrogenated kerosene, paraffin oil, methylene chloride, trichloroethylene and preferably hexane, heptane, octane, and perchloroethylene. The amount of solvent employed can vary widely, e.g., 5 to 2,000% by weight, preferably 50 to 1,000% by weight, based on the monomer employed. Low-molecular oily polymers can also advantageously be prepared without a solvent by mass polymerization, so long as the viscosity of the thus-reacted mixture remains reasonably low.

The amount of catalyst which need be employed is very low. For example, in case of tungsten hexachloride, only about 0.5–2 millimols per liter of reaction volume, or about 1 mol per 1,000–5,000 mols of monomer, is required. The concentration of organometallic catalyst component depends primarily on the purity of the monomer and the solvent employed, i.e., the amount of moisture, peroxides, proton-active impurities, such as alcohols, acids, and other compounds reacting with alkyl metals, such as ethers, amines, ketones, aldehydes, etc., present therein. When the monomer and the solvent are subjected to a very thorough preliminary purification and the reactants are handled with strict exclusion of air in thoroughly dried reactors, molar ratio of heavy metal compound to active alkyl metal, i.e., an alkyl metal which has not been bound or destroyed by impurities or any additional additives present, of about 1:4 to 1:1, preferably less than 1:1, is generally sufficient. Outside of this range, the catalysts are normally less active.

The polymerization can be conducted continuously or discontinuously. The reaction temperature can vary widely, e.g., between −70° C. and +50° C. However, temperatures between −30 and +30° C. are preferred.

The amount of regulator which is added and, as a consequence, the molecular weight of the polymers produced, can be varied widely without any disadvantageous effects on the yield and the stereospecificity of the polymerization. When employing, for example, cyclobutene or cyclopentene as the monomer, it is thus possible to produce rubber-like products of a high Mooney viscosity, which can be extended with a large amount of oil, as well as other readily processable rubber types.

It is also possible to manufacture highly tacky products of low viscosity and syrupy to oily liquids which can be utilized, for example, as drying oils directly, or after an additional reaction, as binders for varnishes or coating agents.

The amount of regulator needed to attain a product of a specific consistency depends, inter alia, on the type of the monomer employed, the type of regulator employed, the catalyst employed, and the selected polymerization reaction conditions. The exact amount of regulator can readily be determined by a few preliminary experiments.

The amount of polyunsaturated olefinic regulator which is employed can vary from about 0.001–50 molar percent, based on the monomer. Generally, the use of about 0.001–5 molar percent, preferably 0.005–2 molar percent, based on the monomer employed, of regulator results in the production of polyalkenamers having molecular weights in the range of commercial elastomers or thermoplastics. The addition of between 7 and 50 molar percent, perferably between 10 and 20 molar percent of the regulator, based on the monomer employed, generally is required for the production of low-viscosity to oily products.

Surprisingly, it is not necessary in the process of this invention that the regulator be present at the beginning of the polymerization in order to obtain the desired effect. The regulator can, if desired, be added after the polymerization has begun. All that is required is that the catalyst is still active, i.e., the regulator must be added prior to the inactivation of the catalyst and thus be effective on the polymer system for a reasonable period of time, e.g., at least 1 minute. It is thus possible to use regulators which tend to form homopolymers which are insoluble in the reaction mixture if exposed to the catalyst, either by themselves or in a mixture with cycloolefins at the beginning of the polymerization, and thus inactivate the catalyst by inclusion in the insoluble polymer, or which enter into secondary reactions with the catalyst components prior to the actual formation of the catalyst, but which do not react in such a manner with the finished catalyst. The tendency of a regulator to promote homopolymerization or enter into such secondary reactions can quickly be determined by preliminary experiments. Because of this characteristic, it is also possible when an unforeseen rise in the viscosity of a polymerization batch takes place, as occasionally happens, to keep the contents of the kettle stirrable by adding the regulator before inactivation of the catalyst, thus avoiding the extensive work connected with emptying a batch which has become too viscous or even gelled.

With several of the regulators of this invention not only is a reduction in the molecular weight of the polyalkenamers achieved, but there also is a marked increase in yield. Examples of such regulators are 1,5-hexadiene, 1,2-divinylcyclohexane and 1,2,4-trivinylcyclohexane. At present, there is no explanation for this surprising effect.

After the termination of the polymerization reaction, the polyalkenamers can be isolated and purified in a conventional manner. If the polyalkenamers are obtained in solution or in the liquid phase, the residues of the catalyst can be removed with an alcohol or other compound having an acidic hydrogen, by washing out the polymer-containing phase with an aqueous or aqueous-alcoholic solution of agents having a dissolving effect on the catalyst residues, which latter are first present as an alcoholate or a salt of the other compound having an acidic hydrogen atom used to remove the catalyst. Such substances with a dissolving effect on the catalyst are, for example, acids, bases, or complex-forming agents, such as acetylacetone, citric or tartaric acid, ethylenediaminetetraacetic acid, nitrilotriacetic acid, etc.

After the catalyst has been removed, the polymers are separated by precipitation, e.g., by pouring into a precipitant such as, for example, methanol, isopropanol, or acetone, or distilling off the solvent, e.g., by blowing in steam, or by introducing the polymer solution through nozzles into hot water. When the polymer can be precipitated from the solution of the monomer in the form of flakes or a powder, the polymer can first be separated, e.g., by filtration, centrifuging, or decanting from the liquid and thereafter treated to remove the catalyst residues.

In order to protect the polyalkenamers against oxidation, gelling, and other aging phenomena, it is possible to add stabilizers thereto, e.g., aromatic amines or the sterically hindered phenols, at various stages of processing. Also, an optional further purification step can be conducted by reprecipitating the polymer if this should be necessary, to obtain a product of the desired purity. After these operations, the polymer can then be dried in a conventional manner.

The solid polyalkenamers prepared in accordance with the process of this invention exhibit RSV (reduced specific viscosity) values of 0.01–10.00 dl./g. The low-molecular fluid polymers have the average molecular weights in the range of about 500 to 25,000. The term "average molecular weights" means the arithmetic means of the molecular weights.

The examples set forth below serve to explain the invention in greater detail. Unless stated otherwise, all RSV values were determined in benzene at 25° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLES 1–12 AND COMPARATIVE EXPERIMENTS A–E

Into a three-tube 1-liter glass flask with agitating unit and reflux condenser with a dropping funnel attached thereto were introduced, respectively, 100 ml. (77.8 g.) of cyclopentene and 150 ml. of hexane and were brought under an atmosphere of extremely pure nitrogen, to the reaction temperature by cooling or heating, and were mixed with the components of the polymerization catalyst. After the predetermined reaction period, the catalyst was destroyed by the addition of 50 ml. of methanol containing 3 g. of potassium hydroxide and 2 g. of 2,6-di-tert.-butyl-p-cresol ("IONOL"). After the addition of 100 ml. of distilled water and 50 ml. of methanol, so that a second phase containing 50% methanol was formed, the reaction mixture was then further agitated for three hours, to wash out the catalyst residues. The aqueous-methanolic phase was then removed by pipetting and the reaction mixture was washed twice with 50% aqueous methanol. The polymer was then precipitated by pouring the organic phase into 3 liters of methanol. The precipitated product was dissolved once again in 250 ml. of hexane, for purposes of an additional purification, and reprecipitated with methanol to which was again added 2 g. of stabilizer ("IONOL"). After decocting the polymer for 2 hours with 500 ml. of pure methanol, it was dried for 40 hours at 50° C. in a vacuum drying chamber. The thus-purified polymer was employed for determining the yield and the analytical data. In each case, such a blank test (designated in the table by capital letters) was conducted to exclude sources of errors due to changing impurities in the solvent, the monomer, or the catalyst components, in parallel to the polymerizations employing one of three regulator olefins (numbered examples). The regulators to be tested were admixed with the monomers in the examples. In Table 1, the amount of regulator is set forth in molar percent, based on the monomer employed.

TABLE 1.—POLYMERIZATION OF CYCLOPENTENE (100 ML.=77.8 G. PER EXPERIMENT) IN HEXANE (150 ML. PER EXPERIMENT)

[Catalyst system: Tungsten hexachloride/ethanol/ethylaluminum dichloride; Polymerization temperature: 0° C.; Polymerization period: 2.5 hours]

| Experiment number | Catalyst | | | Regulator | | Polymer | | | |
|---|---|---|---|---|---|---|---|---|---|
| | $WCl_6$, mmol | EtOH, mmol | $EtAlCl_2$, mmol | Amount mol percent | Name | Yield, g. | RSV, dl./g. | Trans content, percent | Gel, percent |
| A | 0.5 | 0.5 | 4 | | | 8.0 | 2.7 | 80 | 7 |
| 1 | | | | 1.0 | 1,2-divinylcyclohexane | 20.5 | 1.3 | 85 | 2 |
| 2 | | | | 1.0 | 1,2,4-trivinylcyclohexane | 18.8 | 0.52 | 67 | 2 |
| 3 | | | | 1.0 | n-1,4,9-decatriene | 5.9 | 0.55 | 84 | 2 |
| B | 0.5 | 0.5 | 3 | | | 8.1 | 3.6 | 80 | 2 |
| 4 | | | | 1.0 | 5-ethylidene norbornene | 5.1 | 2.6 | 78 | 49 |
| 5 | | | | 1.0 | 1,4-hexadiene | 4.1 | 1.2 | 81 | 2 |
| 6 | | | | 1.0 | 1,5-hexadiene | 40.1 | 0.51 | 80 | 2 |
| C | 0.5 | 0.5 | 3 | | | 12.0 | 3.2 | 82 | 2 |
| 7 | | | | 0.057 | 1,5-hexadiene | 17.4 | 2.8 | 86 | 2 |
| 8 | | | | 0.114 | do | 27.8 | 2.1 | 86 | 2 |
| 9 | | | | 0.228 | do | 39.8 | 1.03 | 88 | 2 |
| D | 0.5 | 0.5 | 3 | | | 7.3 | 3.5 | 87 | 5 |
| 10 | | | | 1.0 | Divinylbenzene (mixture of isomers) | 6.4 | 2.1 | 89 | 10 |
| 11 | | | | 1.0 | 2-methyl-1,4-hexadiene | 13.6 | 1.8 | 93 | 4 |
| 12 | | | | 1.0 | 2-methyl-1,4,9-decatriene | 11.8 | 1.3 | 81 | 2 |

EXAMPLE 13

Preparation of a Liquid Polybutenamer (Polybutadiene Oil)

This example demonstrates the use of an intermediate fraction obtained in the large-scale commercial synthesis of 1,5,9-cyclodecatriene, by polymerization to a liquid polybutenamer (polybutadiene oil) which is a valuable air-drying oil.

The starting intermediate fraction consists of:

22.5% by weight of 4-vinyl-1-cyclohexene,
55.2% by weight of cis,cis-1,5-cyclooctadiene,
20.9% by weight of cis,trans,trans-1,5,9-cyclododecatriene and
1.4% by weight of an unidentified residue.

In a 2-liter stirrer flask, 50 ml. of this intermediate fraction and 200 ml. of hexane were mixed, under a nitrogen atmosphere, with 1 millimol of tungsten hexachloride, 1 millimol of ethanol and 5 millimol of ethylaluminum dichloride at room temperature, whereupon the polymerization began and the reaction mixture heated up to 28° C. During the course of one-half hour, another 590 ml. of the monomer mixture was added dropwise, so that, in total, 640 ml. (560 g.) was employed. After another 2.5 hours, the polymerization was terminated by the addition of 50 ml. of 10% strength methanolic potassium hydroxide solution. Another 150 ml. of methanol and 200 ml. of water were also added thereto, so that an aqueous-methanolic phase, immiscible with the polymer oil, was produced. By agitating the two phases for one hour, the reaction product was freed of catalyst residues. After decanting the aqueous-methanolic phase, the reaction product was treated twice with 100 ml. portions of 50% methanol, to remove any residual traces of catalyst. Thereafter, the solvent and the residual mixture of monomers were distilled off using a rotary evaporator in a water-jet vacuum. The remainder was 385.2 g. of an almost colorless oil (b.p.$_{.13}$>19° C.), exhibiting a molecular weight of 700±3% (determined by vapor pressure osmosis). The double bonds of this product, detectable by infrared spectroscopy, consisted of 77% in the cis-configuration, 16% in the transconfiguration and 7% in the form of vinyl groups. The iodine number was 468.

EXAMPLE 14

Preparation of a Liquid Copoly-(butene-octene)-amer

By the polymerization of 1,500 ml. (1,275 g.) of a mixture of 14.5% of 4-vinyl-1-cyclohexene, 53.7% of cis-cyclooctene, 0.58% of trans-cyclooctene, 27.5% of cis,cis-1,5-cyclooctadiene and the remainder unidentified first run, using as catalyst 2 millimols of tungsten hexachloride, 1 millimol of ethanol, 11 millimols of ethylaluminum dichloride and 0.5 millimol of allyl-2,4,6-tribromophenyl ether, and by working up the product in accordance with Example 13, 1,081 g. (84.7%) of a yellowish oil was produced having a molecular weight of 1,369±0.6% (determined by vapor pressure osmosis) and an iodine number of 318. Of the double bonds detectable by infrared spectroscopy, 53% were in the trans-configuration, 40% in the cis-configuration and 7% in the form of vinyl groups.

EXAMPLES 15–25 AND COMPARATIVE EXPERIMENTS E–H

COMPARATIVE EXPERIMENTS N–T

Comparative experiments N through T were conducted in the manner described for Examples 1–12 and Comparative Experiments A–D. For each experiment, 100 ml. (87.5 g.) of cyclododecene were employed as the monomer and 150 ml. of technical hexane (boiling point limits: 68–70° C.) were employed as the solvent. The various conjugated dienes were utilized in varying amounts. The molar percent of diolefins set forth in Table 3 refers, in each case, to the cycloolefin employed. For each experiment there was employed as the catalyst 0.5 millimol of tungsten hexachloride, 0.5 millimol of ethanol, and 3 millimols of ethylaluminum dichloride. In all experiments the polymerization time was 2.5 hours at 20° C. The polymerizates were worked up in a manner described above and then analyzed.

The results of these experiments are set forth in Table 3.

TABLE 3

| Experimental Series No. | Conjugated diolefin Name | Mol percent | Polymer Yield G. | Yield Percent | RSV Dl./g. | Trans, percent |
|---|---|---|---|---|---|---|
| N | 1,3-butadiene | | 21.9 | 25.2 | 1.96 | 40 |
|   |   | 1 | 0.8 | 0.9 | 0.30 | 40 |
|   |   | 5 | 0.2 | 0.2 | 0.06 | (1) |
|   |   | 10 | 0.3 | 0.3 | 0.07 | (1) |
| O | Isoprene | | 46.1 | 53.0 | 2.25 | 46 |
|   |   | 1 | 47.1 | 54.2 | 1.07 | 44 |
|   |   | 2 | 10.1 | 11.6 | 0.94 | 52 |
|   |   | 5 | No polymer | | | |
| P | 2,3-dimethylbutadiene | | 21.6 | 24.8 | 2.15 | 45 |
|   |   | 1 | 12.0 | 13.8 | 1.25 | 46 |
|   |   | 5 | No polymer | | | |
| Q | 2,4-hexadiene | | 37.8 | 43.5 | 2.22 | 49 |
|   |   | 1 | 24.9 | 28.6 | 0.47 | 40 |
|   |   | 5 | 7.2 | 8.3 | 0.15 | 42 |
|   |   | 10 | No polymer | | | |
| R | Cyclopentadiene | | 45.4 | 52.3 | 2.26 | 52 |
|   |   | 1 | 16.8 | 19.3 | 1.30 | 46 |
|   |   | 10 | 12.2 | 14.0 | (2) | 34 |
| S | 1,3-cyclododecadiene | | 47.2 | 54.2 | 2.16 | 43 |
|   |   | 1 | 13.9 | 16.0 | 1.02 | 42 |
|   |   | 5 | 1.8 | 2.1 | (2) | 40 |
|   |   | 10 | 1.5 | 1.7 | (1) | (1) |
| T | 1,3-cyclooctadiene | | 26.5 | 30.5 | 1.63 | 41 |
|   |   | 1 | 12.2 | 14.0 | 1.61 | 36 |
|   |   | 5 | 8.1 | 9.3 | 1.52 | 46 |
|   |   | 10 | 4.0 | 4.6 | 1.10 | 43 |

[1] Too little substance.
[2] The polymer contains insoluble components.

NOTE.—All RSV values were measured at 135° C. in "Decalin."

TABLE 2.—POLYMERIZATION OF VARIOUS CYCLOOLEFINS
[Catalyst system: Tungsten hexachloride/ethanol/ethylaluminum dichloride; Polymerization period: 2.5 hours]

| Experiment No. | Monomer Name | Amount Ml. | Amount G. | Catalyst WCl$_6$, mmol | Catalyst EtOH, mmol | Catalyst EtAlCl$_2$, mmol | Pol. temp., °C. | Regulator Amount mol percent | Regulator Name | Polymer Yield, g. | Polymer RSV,[1] dl./g. | Trans content, percent | Gel, percent |
|---|---|---|---|---|---|---|---|---|---|---|---|---|---|
| E | Cyclododecene. | 100 | 87 | 0.5 | 0.5 | 3 | 20 | | | 25.1 | 1.77 | 71 | |
| 15 | | | | | | | | 1.0 | 4-vinyl-1-cyclohexene | 47.2 | 0.45 | 83 | |
| 16 | | | | | | | | 1.0 | 1,2,4-trivinylcyclohexane. | 65.8 | 0.95 | 80 | |
| 17 | | | | | | | | 1.0 | 5-(cis-buten-(2)-yl)-norbornene. | 59.0 | 0.82 | 58 | |
| F | Cyclodecene. | 100 | 87 | 0.5 | 0.5 | 3 | 20 | | | 35.5 | 3.95 | 90 | |
| 18 | | | | | | | | 0.005 | 1,2,4-trivinylcyclohexane. | 50.1 | 1.94 | 87 | |
| 19 | | | | | | | | 0.01 | do | 54.5 | 1.69 | 70 | |
| 20 | | | | | | | | 0.015 | do | 58.4 | 1.51 | 76 | |
| G | cis,cis-1,5-cyclooctadiene. | 28.7 | 25 | 0.5 | 0.5 | 3 | 0 | | | 24.2 | 0.31 | 79 | 45 |
| 21 | | | | | | | | 1.0 | 1,11-dodecadiene | 17.4 | MW: 3,100 | 36 | |
| 22 | | | | | | | | 1.0 | 1,6,9-undecatriene | 21.3 | MW: 2,700 | 60 | |
| 23 | | | | | | | | 1.0 | 5,6-vinyl-1-methylenehydrindane.[2] | 17.2 | MW: 2,100 | 65 | |
| H | Cyclooctene. | 100 | 84 | 0.5 | 0.5 | 3 | 20 | | | 64.2 | 2.22 | 40 | 3 |
| 24 | | | | | | | | 1.0 | Trans-1,4-hexadiene | 48.2 | 0.38 | 41 | <2 |

[1] The RSV values of the polydodecenamers were measured at 135° C. in "Decalin" and those of the remaining polyalkenamers at 25° C. in benzene. The regulated polymers of cyclooctadiene were so low-molecular that, for purposes of characterization, the molecular weight determined by vapor pressure osmosis was utilized in place of the reduced specific viscosity;
[2] Mixture of isomers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of fluid polyalkenamers by the ring-opening polymerization of 1,5-cyclooctadiene, 1,5,9-cyclododecatriene or a mixture thereof employing a ring opening mixed catalyst containing a compound of a metal of Groups 5 through 7 of the Periodic Table and an organometallic compound or hydride of a metal of Main Groups 1 through 3 or Subgroup 2 of the Periodic Table and conducting the polymerization in the presence, in addition to the ring opening catalyst, of 7–50 molar percent, based on the starting monomer, of 4-vinyl-1-cyclohexene.

2. A process according to Claim 1 wherein from 10-20 molar percent of 4-vinyl-1-cyclohexene is employed.

3. A process according to Claim 1 wherein the catalyst is a mixed catalyst containing as its metallic compounds, tungsten hexachloride and an organolithium, organomagnesium, or organoaluminum compound.

4. A process according to Claim 3 wherein the catalyst is a mixture of tungsten hexachloride and ethylaluminum dichloride.

5. A process according to Claim 1 wherein a mixture of 1,5-cyclooctadiene and 1,5,9-cyclododecatriene is polymerized.

6. A process according to Claim 1 wherein the 4-vinyl-1-cyclohexene is mixed with the starting monomer or monomer mixture prior to the polymerization.

7. A process according to Claim 6. wherein the catalyst is a mixed catalyst containing as its metallic compounds, tungsten hexachloride and an organolithium, organomagnesium, or organoaluminum compound.

8. A process according to Claim 7 wherein a mixture of 1,5-cyclooctadiene and 1,5,9-cyclododecatriene is polymerized using as a catalyst a mixture of tungsten hexachloride and ethylaluminum dichloride.

References Cited

UNITED STATES PATENTS

| | | | |
|---|---|---|---|
| 3,449,310 | 6/1969 | Dall' Asta | 260—93.1 |
| 3,632,849 | 1/1972 | Pampus | 260—93.1 |
| 3,634,376 | 1/1972 | Nutzel | 260—88.2 R |
| 3,463,828 | 8/1969 | Crain | 260—666 |
| 3,597,403 | 8/1971 | Ofstead | 260—88.2 |
| 3,627,739 | 12/1971 | Devlin | 260—88.2 |
| 3,634,540 | 1/1972 | Wang | 260—683.2 |
| 3,641,174 | 2/1972 | Lyons | 260—666 A |
| 3,029,231 | 4/1962 | Amerongen | 260—94.9 C |
| 3,558,518 | 1/1971 | Zuech | 260—94.9 C |
| 3,691,253 | 9/1972 | Hughes et al. | 260—94.9 C |
| 3,707,520 | 12/1972 | Pampus et al. | 260—93.1 |

FOREIGN PATENTS

| | | | |
|---|---|---|---|
| 910,132 | 11/1962 | Great Britain | 260—94.9 C |

JOSEPH L. SCHOFER, Primary Examiner

E. J. SMITH, Assistant Examiner

U.S. Cl. X.R.

260—88.2 D, 88.2 E, 93.1, 680 R, 683 D